United States Patent
Fantin

[15] 3,658,195
[45] Apr. 25, 1972

[54] DISAPPEARING SAFETY WEDGE

[72] Inventor: Louis M. Fantin, Richmond, Calif.

[73] Assignee: Chevron Research Company, San Francisco, Calif.

[22] Filed: June 12, 1970

[21] Appl. No.: 46,266

[52] U.S. Cl. .......................214/10.5 R, 105/369 C, 105/385
[51] Int. Cl. .........................................................B65g 1/14
[58] Field of Search ......................214/10.5; 248/119, 214; 105/368 B, 369 C, 385; 280/144, 147

[56] References Cited

UNITED STATES PATENTS

| | | | |
|---|---|---|---|
| 1,189,434 | 7/1916 | Eaid | 105/385 |
| 1,228,952 | 6/1917 | Myhre | 105/385 |
| 1,629,576 | 5/1927 | Irish | 248/214 |

Primary Examiner—Gerald M. Forlenza
Assistant Examiner—Frank E. Werner
Attorney—A. L. Snow, F. E. Johnston, G. F. Magdeburger, R. L. Freeland, Jr. and N. E. Reitz

[57] ABSTRACT

Pairs of wedge means are slidably mounted on cross members to permit the safe storing or transporting of cylindrically shaped objects. Individual wedge means are adapted to rotate between a first position where the wedge means is stowed over the end of a cross member and a second position where the wedge means is perched on top of a cross member to function as a wedge for cylindrically shaped objects. The wedge means are prevented from sliding off a cross member by contact with a stop means such as a longitudinal member which connects a series of cross members.

3 Claims, 8 Drawing Figures

Patented April 25, 1972 3,658,195

INVENTOR
LOUIS M. FANTIN

BY Norman E. Reitz
Ralph L. Freeland Jr.
ATTORNEYS

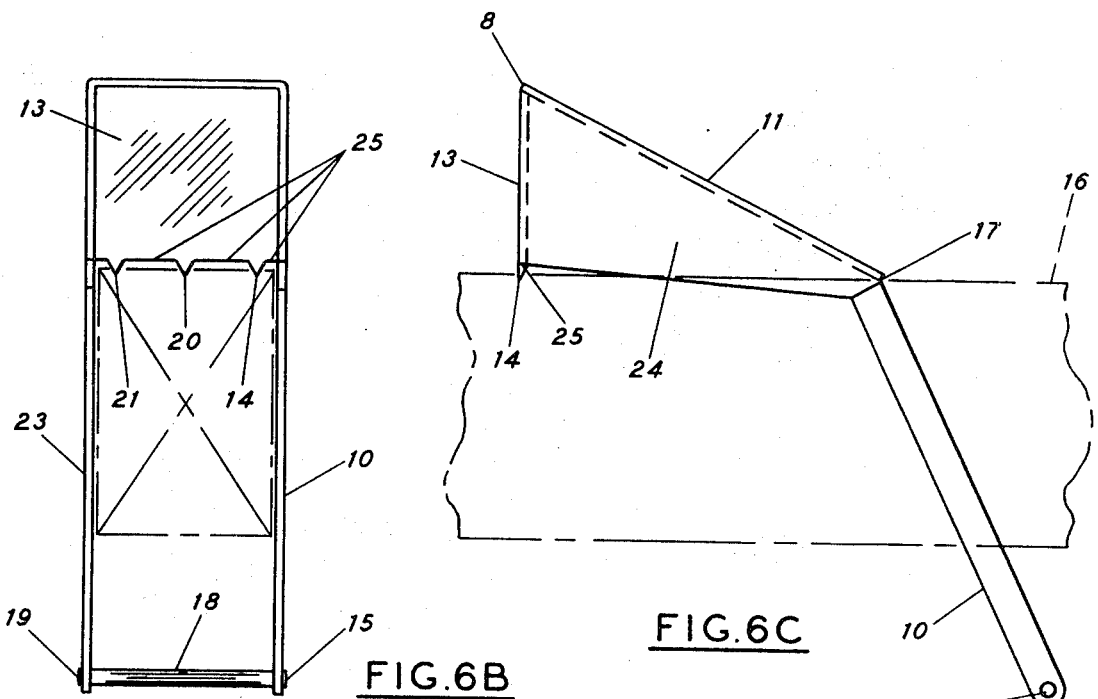
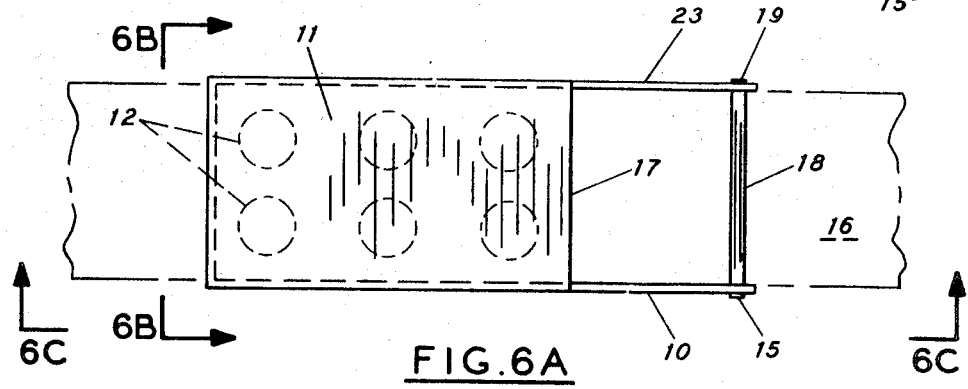
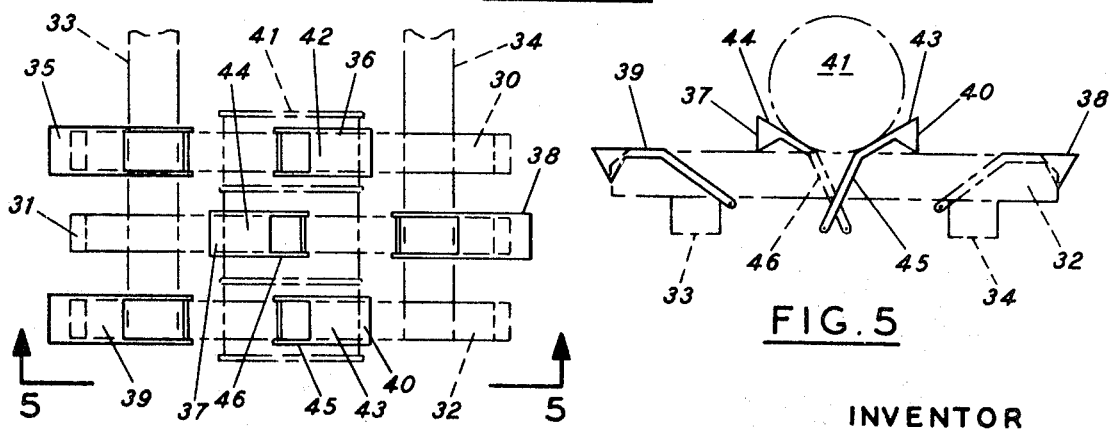

DISAPPEARING SAFETY WEDGE

This invention relates to wedge means for preventing cylindrically shaped objects such as pipes or tubing from rolling off storage or transporting beds.

The primary object of my invention is to provide an effective and convenient wedge means to shore up cylindrically shaped loads while they are being transported or stored. It is evident that cylindrically shaped loads of pipes, barrels, logs, etc., are highly unstable unless wedges are used to prevent the bottom members of the load from rolling out from under the load or unless the whole load is tied down tightly. Portable wedges have been used in the past but were found to have the disadvantages of being easily lost or stolen and of requiring storage space when not in use. At times, truckers and others would attach portable wedges to ropes or straps to avoid some of these problems, but the wedge, with its attached umbilical cord, would still interfere with the loading and unloading. The present invention permits the utilization of the wedge when it is needed and permits the utilization of the storage or transporting bed without the wedge when the wedge is not needed. The present invention also obviates the problems of loss or storage as the wedge cannot be readily removed from the storage or transporting bed.

A further and desirable object of my invention is the provision of a wedge means for supporting loads of cylindrically shaped objects, which wedge means can be placed at any position on a storage or transporting bed. For example, if one large pipe or barrel were to be transported or stored, it would be desirable to place the pipe or barrel on one side of the transporting or storage bed so that the remainder of the bed could be used for the transportation or storage of other materials or goods. The wedge means of my invention is slidable along the cross beams constituting the storage or transporting beds so they may be positioned at any place on the surface of the bed. Thus, mixed loads of cylindrically shaped objects and objects with other shapes can readily be stored or transported.

The wedge means of my invention comprises an object molded or worked into the configuration of two flat plates designated as the support plate and the end plate. The plates are joined together at an angle smaller than 180°. Several short sharp spikes are constructed or affixed to the edge of the end plate remote from the support plate. These spikes stick into the cross member of the storage or transporting bed, typically constructed of timber, while the object is functioning as a wedge, thereby keeping the wedge in place. Flanges are affixed to the two edges of the support plate which touch but do not form the junction of the two plates. These flanges run the length of the support plate and are approximately perpendicular to the support plate. At the edge of the support plate remote from the end plate both flanges extend away from this other side. The extensions of the flanges are in the same plane as the flanges themselves and in these planes the extensions make an angle of less than 180° with the aforementioned edges of the support plate. The extensions are long enough so that their ends extend below a cross member of the storage or transporting bed when the wedge is functioning in the wedge mode. They are also long enough so that the support plate lies flat on the upper surface of the cross member while the end plate is fitted over the end of the cross member. In one embodiment a hole is drilled in each end of the extension and an axle means is used to connect the two extensions to provide an axis of rotation for the wedge means relative to the cross member. The axle means, the two flange extensions, and the edge of the support plate remote from the end plate form a window means through which a cross member may pass. When a cross member is fitted through said window means the wedge can be rotated from the storage position where the end plate is fitted around an end of a cross member to the wedge position where the spiked edge of the end plate and the edge of the support plate remote from the end plate are perched on top of a cross member.

The above listed objectives and descriptive material are illustrative only and other features, advantages and objects of my invention will become apparent by reference to the following description of the drawings which form a part of the specification.

FIG. 4 is a plan view of one embodiment of a storage or transporting surface which contains 3 pairs of wedge means, phantom longitudinal support members and 3 phantom cross members with a barrel resting across them. Opposing members of successive pairs of wedge means are in contact with the barrel obviating any possibility that the interaction of the flange extensions of a pair of wedge means would prevent the wedge means from securely holding the barrel.

FIG. 5 is a frontal elevation of the embodiment of FIG. 4, illustrating the way that interaction between opposing flange extensions is avoided.

FIG. 6A is a plan view of an embodiment of a single wedge means in place on a phantom cross member which illustrates the support plate and window means.

FIG. 6B is a frontal elevation of an embodiment of a single wedge means in place on a phantom cross member which illustrates the end plate and the window means.

FIG. 6C is a side view of an embodiment of a single wedge means in place on a phantom cross member which illustrates the flange and flange extensions.

Figure 1:
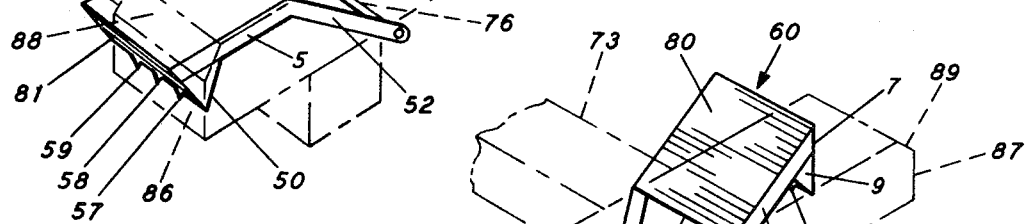
FIG. 1 is a perspective view of a pair of the wedge means of the present invention set up in the wedge mode. The wedge mode is illustrated by the position of the wedge means on top of a phantom cross member.
Figure 1:
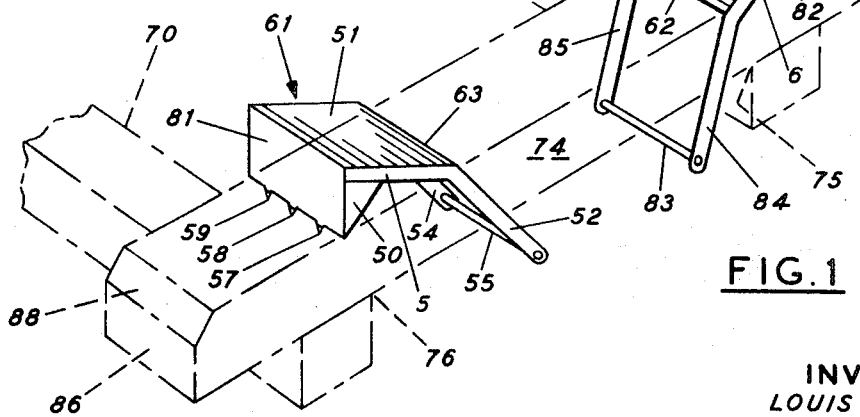

In FIG. 1 a pair of wedge means, 61 and 60, are set up on cross member 74 to function as wedges. Spikes 57, 58, and 59 on end plate 81 of wedge means 61 and spike 82 and others on wedge means 60 have been sunk into cross member 74, typically constructed of wood. The wedge means is held securely in place by these spikes and by the weight on the lower edges 63 and 62 of support plates 51 and 80 of wedge means 61 and 60, respectively. The pair of wedge means is thus disposed so that support plates 51 and 80 will come in contact with the load being stored or transported and will keep the load from sliding from side to side or will keep individual members of the load from rolling out from under the load. Flanges 5 and 6 are contiguous with the edges of support plates 51 and 80 of wedge means 61 and 60, respectively. The flanges are in the same plane and are connected with flange extensions 52 and 84, respectively. In the embodiment depicted in FIGS. 1, 2 and 3, flanges 5 and 6 are strengthened by adding structural support sections 50 and 9, respectively. These structural support sections are connected to end plates 81 and 7. The strengthening of the flanges serves to prevent buckling of the wedge means at the junction between the support plate and the end plate, e.g., the junction between support plate 51 and end plate 81 of wedge means 61.

Figure 2:
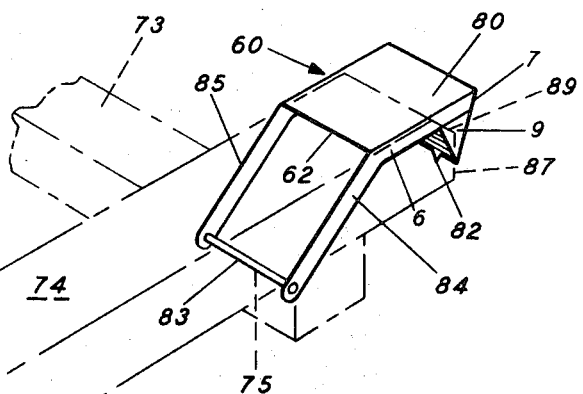
FIG. 2 is a perspective view of a pair of the wedge means of the present invention when the means are stowed over the ends of phantom cross members. The wedge means are shown to be constrained from sliding off the phantom cross members by contact with the phantom longitudinal members.

By examining FIG. 2 in relation to FIG. 1, it is clear that, in the embodiment shown, the wedge means are slidably adjustable along cross member 74 up to the lines of contact between wedge means 61 and 60 with longitudinal members 70 and 73, respectively. Wedge means 61 has been slid from a centrally located position on cross member 74 to a position where axle means 55 rests against the junction 76 formed by cross member 74 and longitudinal member 70. Likewise, wedge means 60 has been slid from a centrally located position on cross member 74 to a position where axle means 83 rests against the junction 75 formed by cross member 74 and longitudinal member 73. The range of adjustment equals the lateral distance between the inside surfaces of longitudinal members 70 and 73. Slidable adjustability within this range is limited only by the condition that an individual wedge means cannot cross over another wedge means; for example, axle means 55 and flange extensions 52 and 54 of wedge means 61 cannot pass through, over or under axle means 83 and flange extensions 84 and 85 of wedge means 60. As stated previously, this adjustability permits a part of the storage or transporting bed to be used for a cylindrical load while the remainder of the bed can be used for other purposes. It also permits cylindrical loads to be tightly made up, i.e., the wedge means can be custom fitted to the load so there is no danger that a portion of the load will roll around the bed or fall off the bed and injure workmen or a bystander.

In FIG. 2, wedge means 60 and 61 are folded over ends 86 and 87, respectively, of cross member 74. In the embodiment shown, the top portions of ends 86 and 8 have been bevelled off to form surfaces 88 and 89 which facilitate the 87 stowing of the spiked end plates of wedge means 60 and 61; for example, end plate 81, spikes 57, 58 and 59, and structural support section 50 of wedge means 61 can be more easily moved over end 86 of cross member 74 due to the presence of bevelled surface 88. Support plates 51 and 80 of wedge means 61 and 60, respectively, have a finite thickness so that when the wedge means are stowed the storage or transporting bed will not be perfectly flat. In one embodiment of my invention, the upper surface of cross member 74 is cut out at the ends so that support plates 51 and 80 fit snugly at the ends and the upper surfaces of support plates 51 and 80 are level with the surface of the storage or transporting bed when the wedge means is stowed. The desirability of having a uniformly flat surface when the wedge means are stowed must be balanced against the prospect of having a depression in the ends of the cross members when the wedge means are set up in the wedge mode. Uniformly flat surfaces are desirable if there is any likelihood that the cross members will be double stacked to achieve greater strength, i.e., if one cross member is turned upside down and placed on a stationary cross member so that a double timber thickness is obtained and a heavy load can be layed across the stacked cross members.

The shift from the wedge mode of FIG. 1 to the stowed mode of FIG. 2 is accomplished by rotating the individual wedge means about the axle means which connects the flange extensions. It is evident that a slidable adjustment must be made in conjunction with a rotation in order for the shift to be accomplished.

Figure 3:
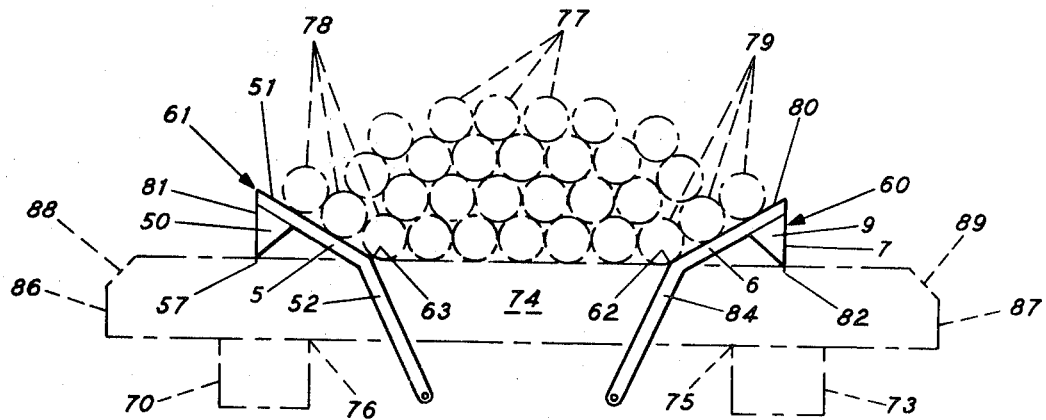
FIG. 3 is a side view of a pair of wedge means set up in the wedge mode with a possible phantom load of cylindrical objects shown thereon.

The cylindrical load of FIG. 3 is kept from tumbling out of place by the wedge support provided to side members of the load 78 and 79 by support plates 51 and 80 of wedge means 61 and 60, respectively. Bottom and middle members of the load are held in place with contact with the bottom and by contact with other members of the load. Topmost members of the load 77 have some instability in the horizontal direction. For storage purposes, the stability of members 77 is sufficient. Under normal transporting conditions, topmost members 77 will stay in place but on bumpy and curvy roads they might tend to roll off; thus, in one embodiment of my invention a strap is wrapped around the outside of the load to provide additional horizontal stability to the topmost members of the load.

Individual wedge means are typically constructed from a single piece of material such as sheet steel which is bent into the shape of the finished wedge means. Consequently, as shown in FIGS. 6A, 6B and 6C, no connecting means are required to connect support plate 11 with flange 24 or end plate 13 or to connect flange 24 with flange extension 10. After experimental tests of prototypes of my wedge means it became evident that the preferred embodiment should have a sturdy flange to prevent buckling at junction 8 between support plate 11 and end plate 13. FIG. 6C illustrates preferred flange 24 which can be of unitary construction with the two plates or which can be welded in place. For light loads, structural support section 50 of wedge means 61 shown in FIGS. 1, 2 and 3 was found to be satisfactory when attached between flange 5 and end plate 81. Referring again to FIGS. 6A, 6B and 6C, it can be seen that the two areas of support of the wedge means are edge 17 where the underside of support plate 11 rests against cross member 16 and edge 25 of end plate 13 as well as spikes 21, 20 and 14. The wedge means is constrained from sliding out from under a load by the downward force on edge 17 and edge 25 and by the fact that spikes 21, 20 and 14 are sunk into cross member 16. Axle means 18 fits through holes drilled in the bottom ends of flange extensions 10 and 23. In the embodiment illustrated in FIG. 6A, the ends 15 and 19 of axle means 18 have been hammered flat to keep it from sliding out of the holes in the flange extensions and, thus, to provide a permanent axis of rotation for the wedge means. In another embodiment of my invention, a bolt and nut were used. As illustrated in FIG. 6A by phantom holes 12, in one embodiment of my invention the weight of the wedge means is reduced by cutting holes in the flat surfaces of the wedge means. This practice renders the wedge means easier to handle without losing much structural strength.

As noted above, a pair of wedge means cannot slide past each other because the axle means will interact. Consequently, for a pair of wedge means with arbitrary size and configuration, there will be a minimum diameter for a cylindrical single member load for which the pair of wedge means will be able to effectively provide wedge support. A cylindrical single member load with a smaller diameter than the minimum diameter will roll back and forth between the opposing wedge means. This limitation can be circumvented by using a scheme similar to that shown in FIG. 4. In FIG. 4, three cross members, 30, 31 and 32, are placed parallel but apart on longitudinal members 33 and 34. Cross members 30, 31 and 32 have pairs of wedge means, 35 and 36, 37 and 38, and 39 and 40, mounted on them, respectively. In order to obviate the crossover problem, alternate wedge means 40, 37 and 36 of successive cross members 32, 31 and 30 are used to support barrel 41. Alternate wedge means 39, 38 and 35 which are not in use can be stowed as shown in FIGS. 4 and 5. In FIG. 5 flange extensions 45 and 46 of wedge means 40 and 37 respectively do not come in contact because they are on different cross members so there is no cross-over problem. Barrel 41 rests on support plates 43, 44 and 42 of alternate wedge means 40, 37 and 36, respectively. It is evident that a small diameter single member load could be stored or transported on one side of a bed while the remainder of the bed could be used for any desired purpose.

While various views and embodiments of my invention have been illustrated in the drawings and described in the specification, they are not intended as expressing the limits of my invention; rather, my invention is intended to include all embodiments and variations within the scope and spirit of the appended claims.

I claim:

1. As an article of manufacture, wedge means for mounting on a cross bar to prevent objects carried on such cross bar from rolling off or shifting thereon comprising a support plate portion and an end plate portion forming substantially a right angle therebetween so that the remote edges of said support plate and end plate portion will engage the upper surface of said cross bar when said wedge means is in a load support position, side flanges secured to the edges of both said support and end plate portions and extending beyond said support plate portion to form an opening in said wedge means remote from said end plate portion for passage of a cross bar therethrough, and axle means extending between the outer ends of said flange extensions to close said opening and being adapted to engage support means for said cross bar to prevent loss of said wedge from said cross bar, the length of said flange extensions being sufficiently greater than the thickness of said cross bar to permit said support plate portion to lie substantially flat on said cross bar when said end plate portion overlies the end of said cross bar and to permit said remote edges of said support plate portion and said end plate portion to engage the upper surface of said cross bar without interference from said axle means.

2. The wedge means of claim 1 wherein a plurality of spikes are affixed to the edge of said end plate portion remote from said support plate portion for engagement with the surface of said cross bar.

3. The wedge means of claim 1 wherein said flange extensions forming said window means make an angle with the surface of said support plate portion within the preferential range of 90° to 180°.

* * * * *